United States Patent

Marks

[11] Patent Number: 6,079,532
[45] Date of Patent: Jun. 27, 2000

[54] SLIDE SWITCH SELECTABLE ONE WAY CLUTCH

[75] Inventor: Joel S. Marks, Los Angeles, Calif.

[73] Assignee: WorkTools, Inc., Chatsworth, Calif.

[21] Appl. No.: 09/200,288

[22] Filed: Nov. 25, 1998

[51] Int. Cl.$^7$ .............................. B25B 13/46; F16D 41/08
[52] U.S. Cl. .............................................. 192/43; 192/45.1
[58] Field of Search ...................... 192/41 R, 43, 192/43.1, 43.2, 45.1, 45.2, 47; 81/58, 60, 61, 62, 63, 63.1, 63.2; 188/82.1, 82.2, 82.7, 82.8

[56] References Cited

U.S. PATENT DOCUMENTS

| | | |
|---|---|---|
| 592,213 | 10/1897 | Smith . |
| 828,884 | 8/1906 | Henrikson .......................... 192/43.2 X |
| 2,331,339 | 10/1943 | Morris ..................................... 192/45.1 |
| 2,735,324 | 2/1956 | Goldwater et al. . |
| 2,766,648 | 10/1956 | Jazwieck . |
| 3,865,219 | 2/1975 | Dossier . |
| 3,877,556 | 4/1975 | Brownscombe . |
| 4,162,000 | 7/1979 | Zlotek . |
| 4,669,339 | 6/1987 | Cartwright . |
| 4,884,478 | 12/1989 | Lieser . |
| 5,482,144 | 1/1996 | Vranish . |
| 5,518,094 | 5/1996 | Myrick ..................................... 192/45.1 |

*Primary Examiner*—Richard M. Lorence
*Attorney, Agent, or Firm*—Paul Y. Feng; Fulwider Patton Lee & Utecht, LLP

[57] ABSTRACT

A stepless ratchet one way clutch mechanism as applied to an improved screwdriver tool is disclosed. A wheel is rotationally fixed to a drive shaft. Two couplings are rotatably mounted about the drive shaft and extend away from the drive shaft. The wheel is between the couplings. A lever is pivotably attached to the couplings at a pivot pin between the couplings. The pivot pin is beyond the wheel outer diameter. When the lever is rotated in relation to the couplings an engaging edge of the lever presses the outer diameter surface of the wheel. The interface between the lever and wheel is of high friction. The interface has a "V" groove on one of the lever or wheel, and a "V" chamfer rib on the other of the lever or wheel. An elongated resilient spring biases the pivot pin either directly or through the lever or coupling to cause the lever to rotate in relation to the couplings. When the lever is held at a distal end while the pin is biased, the wheel is prevented from rotating in one or the other direction. The spring includes a "Z" shaped portion such that a slide switch causes a side to side bias on the spring.

17 Claims, 3 Drawing Sheets

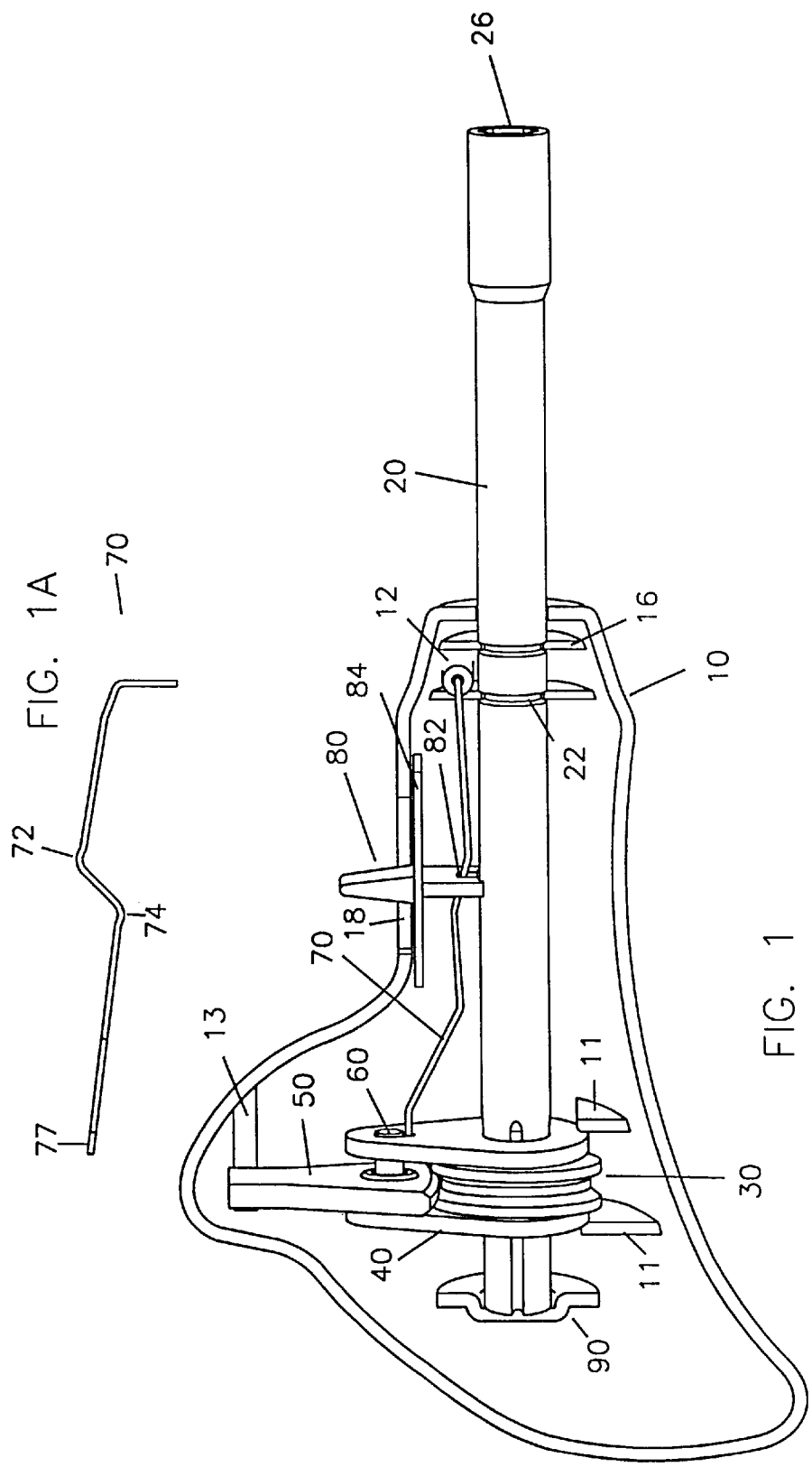

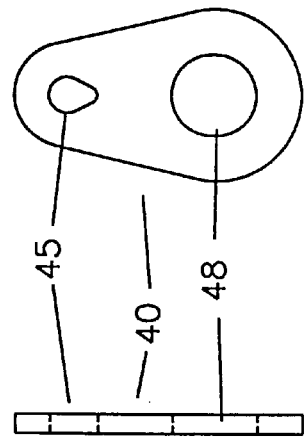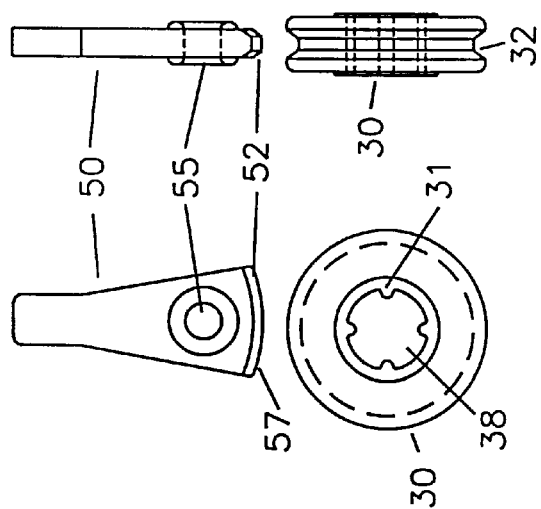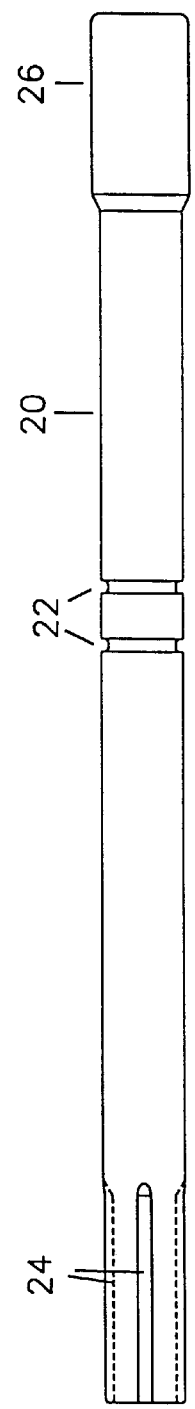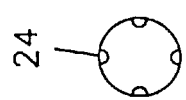

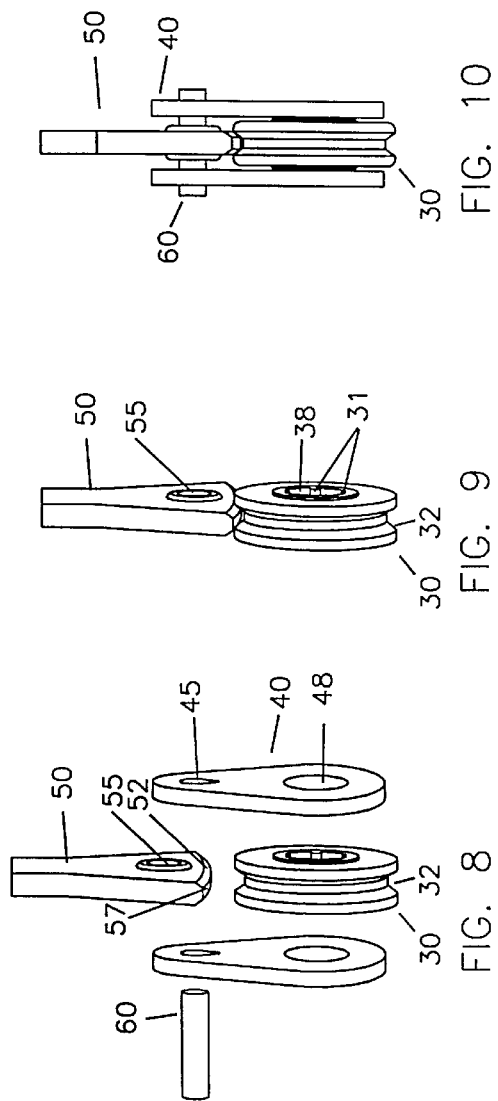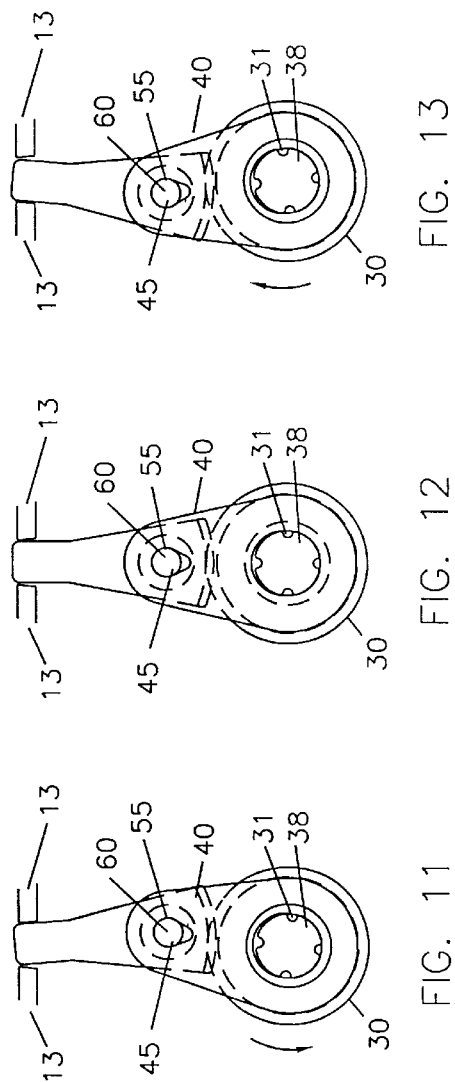

SLIDE SWITCH SELECTABLE ONE WAY CLUTCH

FIELD OF THE INVENTION

The present invention relates to ratchet driving tools. More precisely, the present invention relates to improvements in a stepless ratchet screwdriver.

BACKGROUND OF THE INVENTION

Ratchet driving tools are well known, both in the form of ratchet wrenches and ratchet screwdrivers. Ratchet screwdrivers are distinct from ratchet wrenches by being of a different shape and importantly, by usually having a lighter construction. The purpose of either tool is similar in that oscillating rotation of a handle causes a drive shaft to progressively rotate. The rotation turns a screw or nut fastener.

Ratchet tools typically function by a toothed pawl engaging splines. The splines are spaced around the either the outside or the inside of a cylindrical surface. In the case of the former the cylindrical surface is part of the drive shaft. In the case of the latter the cylindrical surface is part of the tool body.

An improvement to ratchet tools is a stepless mechanism wherein a wedging action replaces the teeth. Two basic types of stepless actions are known. One design uses discrete rolling elements and transmits torque entirely by containing an efficient expanding force. A second version is a cam wedge brake which combines a wedging action with friction to transmit torque. Since the desire in a driving tool is to transmit torque rather than to contain an expanding force, a device that combines wedging with friction will be most effective.

A sprag clutch falls into the category of rolling elements. For example, U.S. Pat. No. 4,162,000 shows a typical sprag clutch. Eccentric shaped sprag elements are held between an inner and an outer circular race. This type of design is quite common in machinery. A variation of the sprag clutch is shown in U.S. Pat. No. 5,482,144. In this design the sprag elements are wedged in two ways; first between the inner and outer races, and second within angled channels of each race.

Another rolling element clutch is shown in U.S. Pat. No. 4,884,478. In this screwdriver design three round rollers fit between a cylindrical outer wall and an eccentric rotatable shaft. This differs from the sprag clutch in that the shaft is eccentric rather than the rolling elements. Designs similar to the '478 patent are the most common type mechanism for stepless ratchet hand tools. Either three or four rollers are typical.

Another similar design is contained within a wrench handle. U.S. Pat. No. 4,669,339 is distinct from the '478 patent above in certain details. Balls 56 of the '339 patent provide the direction selecting bias in the same manner shown by ball 48 in FIG. 6 of the '478 patent.

Similar roller type clutches have been known for more than 100 years. U.S. Pat. No. 592,213, from 1897, shows a roller clutch with direction selecting means similar to the above '478 and '339 patents.

To transmit high torques a rolling element clutch must have large numbers of rollers as in a sprag clutch used for machinery, or it must be large in size. A simpler clutch using fewer rollers still requires precision tolerances to achieve limited torque.

Various one way clutches of the friction style are known. For instance, U.S. Pat. No. 2,735,324 shows a stepless ratchet wrench using a wedging brake action. A brake element is forced into a gap between the rotating shaft and housing body. Empirical testing has indicated this design is not effective. U.S. Pat. No. 2,766,648 discloses an improved wedging method. The rotating shaft features a "V" shaped outer circumference. A corresponding "V" contoured wedge element presses the shaft in direct proportion to a torque on the handle. The "V" shape functions similarly to an automotive "V" belt, wherein the contact friction is amplified by wedging in the "V". In this case a double wedging action occurs, first from the leverage from the handle, and second from the wedging within the "V".

U.S. Pat. Nos. 3,865,215 and 3,877,556 are quite similar to each other. A rotatable shaft includes an eccentric cam which forces shoe elements outward to press the inside wall of a housing. Both the '215 and '556 patents show embodiments where the shoe to housing interface comprise "V" contoured surfaces. Specifically surfaces 16" in FIG. 6 of the '556 patent, and elements B and P in FIG. 4 of the '215 patent are "V" contoured engagements.

Although some of the above friction drives may be effective in torque, they all suffer limitations of complexity and direction selecting ability. None of the friction clutches disclose a means to change direction. Although this is acceptable for machinery, hand tools require a convenient way to change direction. A need therefore exists for an efficient low cost stepless ratchet tool mechanism with a simple means to switch direction.

SUMMARY OF THE INVENTION

The present invention in a preferred embodiment combines a wedge coupling with a "V" groove friction engagement within a tool housing to provide an efficient, low cost, stepless ratchet drive. In the preferred embodiment a slide switch is linked to a coupling to produce a rotational bias upon the coupling. Sliding the switch from front to back causes the coupling to be biased in one or the other rotational direction. In a further preferred embodiment the switch and coupling are linked by an elongated spring wire.

The mechanism essentially comprises a wheel rotationally fixed to a drive shaft. The wheel has a circumferential "V" groove and resembles a belt driven pulley. Two elongated couplings are rotationally fitted to the shaft on each side of the wheel. A lever is pivotably linked to the distal end of the couplings and extends to a lever distal end. A rib of the lever has a "V" profile to fit the groove of the wheel. Pressing the lever distal end causes the inside rib of the lever to wedge into the wheel groove. The lever distal end is fixed in the housing body, except that the lever may rotate slightly about its distal end.

The mechanism necessarily extends a distance away from the shaft. This is suitable for a tool wherein the body has an "L" shape or other enlarged shape. A more radially compact design could have two shorter levers extending separately away from the shaft and linked to the same or additional couplings. An equivalent torque could be achieved.

In an alternative embodiment, the "V" contours between the lever and wheel could be reversed so that the lever is grooved and a rib of the wheel extends into the groove of the lever. A further alternative embodiment could comprise two wheels beside one or three couplings. A double edged lever, or two parallel levers, would engage each wheel. In general any multiple of levers, wheels, grooves and couplings may be used.

A "V" groove engagement is not the only way to provide a high friction interface. For example, high friction coatings such as carbide grit may be used where the lever and wheel make contact.

The preferred embodiment selector spring wire includes an approximate "Z" shape segment. A switch sliding in the housing parallel to the shaft presses the wire to one side or another. A distal end of the spring wire is linked near to the pivotal connection between the coupling and the lever. This wire linkage can be moved side to side to cause respectively the lever to rotate about its distal end, and the couplings to rotate about the shaft center under the bias of the spring. The respective rotations are limited at the point where the lever becomes wedged into the wheel.

Other methods to bias the assembly may be used. For example a rotatable collar linked to a spring is a well known method. However, in the preferred embodiment a slide switch is linked to a spring as described above to facilitate changing bias directions with one hand.

Although the exemplary embodiment of the mechanism of the present invention is shown within a screwdriver hand tool, other applications for the present invention are contemplated.

BRIEF DESCRIPTION OF THE DRAWINGS

FIG. 1 is a partial isometric view of the components of a stepless screwdriver, with a cover half of a housing removed.

FIG. 1A is a perspective view of spring wire 70.

FIG. 2 is a front elevation of a wheel and a lever.

FIG. 3 is the wheel and lever of FIG. 2, rotated 90 degrees.

FIG. 4 is an edge view of a coupling.

FIG. 5 is the coupling of FIG. 4, rotated 90 degrees to show a front.

FIG. 6 is a rear end view of a drive shaft.

FIG. 7 is a side elevation of the drive shaft of FIG. 6.

FIG. 8 is an exploded isometric view of an assembly of two couplings, a wheel, a lever, and a linkage pin.

FIG. 9 is an isometric view of a wheel and lever in contact.

FIG. 10 is a side elevation of the assembly of FIG. 8.

FIG. 11 is a front elevation of the assembly of FIG. 10, biased to prevent rotation in a clockwise direction.

FIG. 12 is the assembly of FIG. 11, in a neutral position.

FIG. 13 is the assembly of FIG. 11, biased oppositely.

DETAILED DESCRIPTION OF THE PREFERRED EMBODIMENTS

FIG. 1 is a partial isometric view of the components of a preferred embodiment of the present invention stepless screwdriver. As seen in FIG. 1, housing 10 contains the components of the present invention. Only a lower half of housing 10 is shown in FIG. 1. Drive shaft 20 is rotatably fixed within housing 10. Shaft 20 is held against pressing inward by bearing 90. Bearing 90 is shown in partial section to expose the rear end of shaft 20. In the preferred embodiment, shaft 20 is held from pulling out by ribs 16 of housing 10 fitting into grooves 22 of shaft 20. A conventional metal retaining ring could also be used to retain shaft 20 axially. The forces acting inward upon shaft 20 are typically much greater that those pulling outward. This is due to the typical use of a screwdriver, where a user often presses hard against a fastener. Therefore, although grooves 22 could also act against inward thrust, this function is best served by bearing 90. Bearing 90, if designed appropriately, contacts shaft 20 at a center location of the rear end of shaft 20. Hence a large thrust load will spin on bearing 90 with minimal friction. In contrast, a large thrust load on grooves 22 will cause much friction unless a special further component bearing such as a ball bearing is provided at groove 22.

Recess 26 receives a driving bit. Wheel 30 fits around the rear end of shaft 20 wherein shaft 20 extends through hole 38 of wheel 30. In the preferred embodiment, wheel 30 is free to slide axially to a limited extent, being confined axially by ribs 11 of housing 10. Alternatively, wheel 30 could be pressed or otherwise securely attached to shaft 20. If wheel 30 is unrestrained axially it and the other components connected to it can remain in alignment even as housing 10 distorts under load. For example, bearing 90 and its mount in housing 10 may flex as shaft 20 is pressed hard. Wheel 30 will then be fixed by ribs 11 and slide forward slightly along shaft 20. Wheel 30 remains aligned with the associated components. A further advantage of wheel 30 being slidable along shaft 20 is ease of assembly. An attaching operation is not required.

For the purpose of rotationally fixing wheel 30 to shaft 20, as seen in FIGS. 1–3 and 7, splines 24 of shaft 20 engage ribs 31 of wheel 30. Four splines and ribs are preferred but any number may be used. Further, the splines and ribs could take the form of respective flat surfaces or other profiles and still serve the intended function.

It is not necessary that shaft 20 and wheel 30 be separate components of the tool of the present invention. The wheel could serve its intended function as an appropriately formed and integrated section of shaft 20. The main part of the outer diameter of the wheel is preferably a simple cylinder except for the groove described below, but may be a more complex cylindrical or geometrical shape as a design choice.

Two couplings 40, shown in FIGS. 1, and 4–5, are fitted around shaft 20 through holes 48 at each side of wheel 30. Couplings 40 are free to rotate around, and outside of housing 10 to slide along, shaft 20. Couplings 40 are held in position by ribs 11.

Lever 50, shown in FIGS. 1–3, is rotatably linked to couplings 40 at holes 45 and 55 of coupling 40 and lever 50 respectively. Pin 60 provides the linkage. Pin 60 could be a fixedly attached element of lever 50 or couplings 40. Bottom rib 57 of lever 50 is curved in the preferred embodiment to a shape that is determined to provide best function. Chamfered edge 52 follows the profile of bottom rib 57. Chamfered edge 52 mates with "V" groove 32 of wheel 30.

Alternatively, wheel 30 could have no groove and lever 50 could have no chamfer. Instead a high friction interface such as carbide grit or other coating could be used. However, the groove and chamfer design is the preferred method to create a high friction interface since this combination may be less costly and operates smoothly. As discussed above, lever 50 could engage a portion of shaft 20 directly where, for example, a groove or high friction surface is formed directly onto the surface of shaft 20. This would be especially practical if shaft 20 is of a relatively large diameter in the area of lever 50.

It is further not required that the groove be in the wheel. The features could be reversed so that a rib of the wheel engages a slot or groove in the mating edge of the lever.

The wedging action can be seen in FIGS. 11, 12 and 13. FIGS. 11 and 13 show respective opposite selected directions. Lever 50 presses rib 13 in reaction to a torque on shaft 20. Chamfer edge 52 presses the sides of "V" groove 32. The pressing action increases in proportion to the torque causing wheel 30 to be rotationally locked against lever 50 in one direction. Turning wheel 30 in an opposite direction causes the respective mating surfaces of wheel 30 and lever 50 to separate. In the central position of FIG. 12, wheel 30 is spaced apart from lever 50 and is normally free to rotate either direction. In FIG. 11, wheel 30 may rotate counterclockwise. In FIG. 13 wheel 30 may rotate clockwise. In the configuration of FIGS. 11 and 13 the assembly is rotated or twisted to its limit. A bias is required upon the assembly to select one direction or the other. In the case of FIG. 11, a bias in the right direction is present near pin 60. In FIG. 13, the bias is to the left.

The center position shown in FIG. 12 may represent a lock condition if a downward bias is applied to lever 50 and if the assembly is loose such that lever 50 can move downward to contact wheel 30. The assembly will then move between the configurations of FIG. 11 and FIG. 13, but no farther. Lever 50 is always in contact with wheel 30 and a somewhat loose lock condition is created. In a preferred embodiment, hole 48 of coupling 40 is elongated so that the entire assembly of couplings 40, lever 50 and pin 60 can move toward and away from shaft 20. If it is preferred that the center position of FIG. 12 be always free turning then the distance between lever 50 and shaft 20 can be fixed so that lever 50 is always spaced from wheel 30 when the assembly is in the center position. As stated above the shape of bottom rib 57 is such that wheel 30 and lever 50 are naturally spaced apart in the center configuration, or at least the assembly is loose such that lever 50 may be move toward and away from wheel 30.

A device should be present to hold the respective positions of FIGS. 11, 12, and 13. In the preferred embodiment, a slide switch is resiliently linked to near pin 60. To provide this linkage, spring wire 70 shown in FIG. 1A is fitted in housing 10. A forward end of spring wire 70 extends into recess 12 of housing 10. Rear end 77 of spring wire 70 engages the forward coupling immediately below pin 60. To provide a space to receive wire 70, hole 45 of coupling 40 is elongated in a teardrop shape. Hole 45 is then large enough to fit wire 70 and still securely constrain pin 60 against the upward force which occurs during use. For convenience of assembly both couplings have an elongated hole 45, although only the front coupling requires it.

Slide switch 80 moves longitudinally within slot 18 of housing 10. Flange 84 holds switch 80 slidably along ribs, not shown, of housing 10. Slot 82 of switch 80 engages spring wire 70. In FIG. 1, switch 80 is shown in the center position. If switch 80 is slid forward slot 82 will straddle wire 70 just forward of corner 72. The humps visible at 72 and 74 in the detail of spring wire 70 in FIG. 1A help to secure switch 80 in the selected position. It is most natural that the forward position of switch 80 should allow shaft 20 to turn clockwise with respect to a screw fastener. Therefore, pressing corner 72 of spring wire 70 to a center of the device, which occurs when switch 80 is in the forward position, equates to pushing spring wire 70 into the page of FIG. 1. When viewed from the front the assembly takes the configuration of FIG. 11. When viewed from the front, FIG. 11 corresponds to a clockwise turning of a fastener. It follows that when switch 80 is in the rear position such that slot 84 straddles spring wire 70 at corner 74, the assembly will be as in FIG. 13 when viewed from the front. This is the counterclockwise driving condition.

Spring wire 70 may engage pin 60 or lever 50 directly rather than engage the front coupling. Other direction selecting means may be used. For example, a rotating collar of a well known type may be attached at the front of the tool around shaft 20. The collar would be resiliently linked to near pin 60 to provide a selected rotational bias upon coupling 40, pin 60 or lever 50.

An important concept of the direction selecting feature of the present invention is that the assembly of the coupling, pin and lever can be rotated about shaft 20 to a limited extent and be resiliently biased in the selected rotational direction, while a top distal end of the lever is relatively fixed within the housing. It is not required that there be two couplings, one wheel and one lever. For example, two wheels could be positioned in front and behind one coupling. One lever would be aligned with each wheel with the single coupling extending between the two levers. Pin 60 would pass through the front lever, the coupling, and the rear lever. In a slight variation a single lever could have two distinct extensions forming two bottom edges to engage each wheel. A multiple wheel design may be desirable if more friction surface is desired.

Another method to increase the friction surface is to use two separately extending levers. Each lever would press an element equivalent to rib 13. The assembly could then be made more compact to fit different types of tool handles.

From the foregoing detailed description, it will be evident that there are a number of changes, adaptations and modifications of the present invention which come within the province of those skilled in the art. However, it is intended that all such variations not departing from the spirit of the invention be considered as within the scope thereof as limited solely by the claims following.

What is claimed is:

1. A stepless ratchet tool including a one way drive mechanism comprising:

a housing body including a front and a back;

an elongated drive shaft retained within the housing body and able to rotate within the housing body;

a wheel rotationally fixed to the drive shaft, an outer circumference of the wheel defining an external cylindrical surface of the wheel, wherein the external cylindrical surface includes a circumferential groove in the external surface;

two couplings rotatably mounted about the drive shaft, the couplings extending away from the drive shaft and positioned respectively in front of and behind the wheel;

a lever situated between the couplings and extending away from the drive shaft including a lever engaging rib closest to the drive shaft and a lever distal end farthest from the drive shaft, the lever engaging rib being proximate to the circumferential groove of the wheel; and the lever being pivotably linked to the couplings at a pivot pin wherein pivoting the lever in a first direction in relation to the couplings causes a first portion of the lever engaging rib to press within the circumferential groove of the wheel, the wheel thereby being prevented from rotating in a second direction opposite from the first direction.

2. The stepless ratchet mechanism of claim 1, wherein pivoting the lever in the second direction in relation to the couplings causes a second portion of the lever engaging rib to press within the circumferential groove of the wheel, the wheel thereby being prevented from rotating in the first direction.

3. The stepless ratchet mechanism of claim 1, wherein the wheel is slidably held upon the shaft and the wheel is prevented from rotating about the shaft by engagement to splines of the shaft, the splines being formed as longitudinal recesses in a surface of the shaft along a length of the shaft.

4. The stepless ratchet mechanism of claim 1, wherein a shaft long axis and the lever distal end are each held to a fixed location within the housing body, and the pivot pin translates within the housing body in relation to the shaft long axis and the lever distal end to cause the lever to rotate in relation to the couplings.

5. The stepless ratchet mechanism of claim 4, wherein a resilient member of the tool baises the pivot pin in a selected direction.

6. The stepless ratchet mechanism of claim 5, wherein the resilient member comprises an elongated spring, and the spring describes in part a "Z" shaped path, a switch is slidably fitted to the housing body including a slot of the switch engaging the spring, wherein a first position of the switch causes the slot of the switch to press the spring in a first spring bias direction, and a second position of the switch causes the slot of the switch to press the spring in a second bias direction, a distal end of the spring biasing the pivot pin in one of the first and second directions.

7. The stepless ratchet mechanism of claim 5, wherein a position of the resilient member biases the lever toward the wheel such that the lever is in contact with the wheel for all relative rotational positions of the lever and the couplings.

8. The stepless ratchet mechanism of claim 1, wherein the circumferential groove includes a concave "V" shaped section, and the lever engaging rib includes a corresponding convex "V" shaped chamfer section.

9. A stepless ratchet one way drive mechanism comprising:
   a rotatable drive shaft;
   at least one wheel rotationally fixed to the drive shaft, an outer circumference of the wheel defining an external cylindrical surface of the wheel;
   at least one coupling rotatably mounted about the drive shaft and extending away from the drive shaft;
   at least one elongated lever oriented substantially parallel to the coupling and extending away from the drive shaft including a lever engaging end closest to the drive shaft and a lever distal end furthest from the drive shaft, the lever engaging end being proximate to the external cylindrical surface of the wheel;
   the lever being pivotably linked to the coupling at a pivot pin wherein pivoting the lever in a first direction in relation to the coupling causes a first portion of the lever engaging end to press the cylindrical surface of the wheel through a frictional interface, the wheel thereby being prevented from rotating in a second direction opposite from the first direction.

10. The stepless ratchet mechanism of claim 9, wherein pivoting the lever in the second direction in relation to the coupling causes a second portion of the lever engaging rib to press the cylindrical surface of the wheel through a frictional interface, the wheel thereby being prevented from rotating in the first direction opposite from the second direction.

11. The stepless ratchet mechanism of claim 9, wherein the frictional interface comprises a rib pressing into a groove.

12. The stepless ratchet mechanism of claim 11, wherein the rib includes a chamfer "V" shaped convex section and the groove includes a "V" shaped concave section.

13. The stepless ratchet mechanism of claim 9, wherein the frictional interface comprises a hard textured material.

14. The stepless ratchet mechanism of claim 9, wherein the wheel is slidably held upon the shaft and the wheel is prevented from rotating about the shaft by engagement to splines of the shaft, the splines being formed as longitudinal recesses in a surface of the shaft along a length of the shaft.

15. The stepless ratchet mechanism of claim 9, wherein a shaft long axis and the lever distal end are each held to a fixed location upon a supporting structure, and the pivot pin translates in relation to the shaft long axis and the lever distal end to cause the lever to rotate in relation to the coupling.

16. The stepless ratchet mechanism of claim 15, wherein a resilient member of the tool baises the pivot pin in a selected direction.

17. The stepless ratchet mechanism of claim 16, wherein the resilient member comprises an elongated spring, and the spring describes in part a "Z" shaped path, the supporting structure includes a housing body, a switch is slidably fitted to the housing body including a slot of the switch engaging the spring, wherein a first position of the switch causes the slot of the switch to press the spring in a first spring bias direction, and a second position of the switch causes the slot of the switch to press the spring in a second bias direction, a distal end of the spring biasing the pivot pin in one of the first and second directions.

* * * * *

UNITED STATES PATENT AND TRADEMARK OFFICE
CERTIFICATE OF CORRECTION

PATENT NO. : 6,079,532
DATED : Jun. 27, 2000
INVENTOR(S) : Joel S. Marks

It is certified that error appears in the above-identified patent and that said Letters Patent is hereby corrected as shown below:

Column 2, line 13, change "3,865,215", to read --3,865,219--.

Column 2, line 16, change "'215", to read --`219--.

Column 2, line 19, change "'215", to read --`219--.

Column 8, line 30, claim 16, change "baises", to read --biases--.

Signed and Sealed this

Twenty-second Day of May, 2001

Attest:

NICHOLAS P. GODICI

Attesting Officer   Acting Director of the United States Patent and Trademark Office